(12) United States Patent
Joseph et al.

(10) Patent No.: US 12,259,125 B2
(45) Date of Patent: Mar. 25, 2025

(54) DISPLAY DEVICE AND MEANS OF TRANSPORTATION

(71) Applicant: Continental Automotive Technologies GmbH, Hannover (DE)

(72) Inventors: Manrico Joseph, Ober-Ramstadt (DE); Ralph Neupert, Kleinwallstadt (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/199,477

(22) Filed: May 19, 2023

(65) Prior Publication Data

US 2023/0375154 A1    Nov. 23, 2023

(30) Foreign Application Priority Data

May 20, 2022  (DE) ...................... 10 2022 205 083.5

(51) Int. Cl.
*F21V 7/00*     (2006.01)
*F21Y 115/10*   (2016.01)

(52) U.S. Cl.
CPC .......... *F21V 7/0083* (2013.01); *F21Y 2115/10* (2016.08)

(58) Field of Classification Search
CPC .......... G02F 1/133603; G02F 1/133605; G02F 1/133608
See application file for complete search history.

(56) References Cited

U.S. PATENT DOCUMENTS

| | | |
|---|---|---|
| 5,443,285 A | 8/1995 | Boll |
| 6,175,170 B1 | 1/2001 | Kota et al. |
| 7,692,127 B1 | 4/2010 | Linn et al. |
| 9,979,923 B1 | 5/2018 | Nemeth et al. |
| 11,363,745 B1 | 6/2022 | Duncan et al. |
| 2001/0048265 A1 | 12/2001 | Miller et al. |
| 2005/0138852 A1 | 6/2005 | Yamauchi |
| 2006/0203480 A1 | 9/2006 | Choi |
| 2008/0030648 A1 | 2/2008 | Morita et al. |
| 2008/0043463 A1 | 2/2008 | Park et al. |
| 2008/0068860 A1 | 3/2008 | Peng et al. |
| 2010/0001150 A1 | 1/2010 | Chiu |

(Continued)

FOREIGN PATENT DOCUMENTS

| | | |
|---|---|---|
| CN | 103742840 A | 4/2014 |
| DE | 4227528 C1 | 12/1993 |

(Continued)

OTHER PUBLICATIONS

Office Action dated Dec. 20, 2022 from related German patent application No. 10 2022 205 051.7.

(Continued)

*Primary Examiner* — Eric T Eide

(57) ABSTRACT

A display device and a motor vehicle having such a display device is disclosed. The display device has a display panel and a backlight for the display panel. The backlight has a reflector having a plurality of reflectively embodied cavities, and a plurality of light sources in each case arranged in the cavities. Moreover, the backlight has support elements, which are transparent to light emitted by the light sources and protrude at least partially into a gap between the cavities and an optical component arranged below the display panel.

8 Claims, 5 Drawing Sheets

(56) References Cited

U.S. PATENT DOCUMENTS

| | | | |
|---|---|---|---|
| 2010/0090498 A1 | 4/2010 | Jungert et al. | |
| 2010/0141867 A1 | 6/2010 | Ogihara et al. | |
| 2011/0141702 A1 | 6/2011 | Kiesel et al. | |
| 2011/0216527 A1 | 9/2011 | Fan et al. | |
| 2011/0304798 A1 | 12/2011 | Tanaka et al. | |
| 2013/0128128 A1* | 5/2013 | Ikuta | G02F 1/133603 349/67 |
| 2013/0195711 A1 | 8/2013 | Araoka et al. | |
| 2014/0301025 A1 | 10/2014 | Liu | |
| 2014/0306576 A1 | 10/2014 | Ervin et al. | |
| 2016/0046243 A1 | 2/2016 | Rode et al. | |
| 2018/0293964 A1 | 10/2018 | Kuehn et al. | |
| 2019/0265551 A1* | 8/2019 | Liu | G02F 1/133608 |
| 2020/0166803 A1* | 5/2020 | Kyoukane | G02F 1/133608 |
| 2020/0287109 A1 | 9/2020 | Chang et al. | |
| 2020/0292885 A1 | 9/2020 | Liu et al. | |
| 2020/0326592 A1* | 10/2020 | Lin | G02F 1/133608 |
| 2020/0384861 A1 | 12/2020 | Kadam et al. | |
| 2022/0227307 A1 | 7/2022 | Shout et al. | |
| 2022/0299823 A1* | 9/2022 | Li | G02F 1/133611 |
| 2023/0166597 A1 | 6/2023 | Guenther et al. | |
| 2023/0202300 A1 | 6/2023 | Badar et al. | |

FOREIGN PATENT DOCUMENTS

| | | |
|---|---|---|
| DE | 4217177 C2 | 5/1994 |
| DE | 102008023469 A1 | 12/2009 |
| DE | 102008052007 A1 | 4/2010 |
| DE | 102014001862 B4 | 10/2015 |
| DE | 102014111676 A1 | 2/2016 |
| DE | 102014221505 A1 | 4/2016 |
| DE | 102016004156 A1 | 9/2016 |
| DE | 102015010295 A1 | 2/2017 |
| DE | 102016200902 A1 | 7/2017 |
| DE | 102018110548 A1 | 11/2019 |
| DE | 102018218328 B3 | 3/2020 |
| DE | 102020112133 A1 | 11/2021 |
| DE | 102020128465 B3 | 3/2022 |
| DE | 102021103740 A1 | 8/2022 |
| EP | 1687185 B1 | 4/2008 |
| EP | 2156261 A1 | 2/2010 |
| EP | 3006773 A1 | 4/2016 |
| EP | 3045340 A1 | 7/2016 |
| GB | 1148694 A | 4/1969 |
| JP | S6118517 A | 1/1986 |
| JP | 2010135204 A | 6/2010 |
| JP | 2017037832 A | 2/2017 |
| JP | 2020053405 A | 4/2020 |
| KR | 20170061535 A | 6/2017 |
| KR | 20180062573 A | 6/2018 |
| TW | 200842448 A | 11/2008 |
| TW | 200931120 A | 7/2009 |
| TW | 202109160 A | 3/2021 |
| TW | 202142936 A | 11/2021 |
| WO | 2008127731 A1 | 10/2008 |
| WO | 2017097583 A1 | 6/2017 |
| WO | 2020008237 A1 | 1/2020 |
| WO | 2021242558 A2 | 12/2021 |

OTHER PUBLICATIONS

Search Report dated Nov. 16, 2023 from related European patent application No. 23165875.8.

Search Report dated Nov. 14, 2023 from related European patent application No. 23165869.1.

Office Action dated Dec. 16, 2022 from related German patent application No. 10 2022 205 052.5.

Office Action dated Dec. 14, 2022 from corresponding German patent application No. 10 2022 205 083.5.

Search Report dated Oct. 20, 2023 from corresponding European patent application No. 23170127.7.

Office Action dated Jan. 18, 2023 from related German patent application No. 10 2022 205 053.3.

Office Action dated Dec. 13, 2022 from related German patent application No. 10 2022 205 050.9.

Search Report dated Nov. 14, 2023 from related European patent application No. 23165862.6.

Office Action from corresponding Taiwan patent application No. 112118715.

Office Action issued Oct. 22, 2024 from related Korean patent application No. 10-2023-0051656.

Office Action issued Oct. 8, 2024 from corresponding Korean patent application No. 10-2023-0063424.

Office Action issued Oct. 22, 2024 from related Korean patent application No. 10-2023-0051654.

Office Action issued Oct. 22, 2024 from related Korean patent application No. 10-2023-0051655.

Non-Final Office Action dated Feb. 12, 2025 from related U.S. Appl. No. 18/199,465.

* cited by examiner

DISPLAY DEVICE AND MEANS OF TRANSPORTATION

CROSS REFERENCE TO RELATED APPLICATION

This U.S. patent application claims the benefit of German patent application No. 10 2022 205 083.5, filed May 20, 2022, which is hereby incorporated by reference.

TECHNICAL FIELD

The present disclosure relates to a display device and to a means of transportation having such a display device.

BACKGROUND

Display devices in the vehicle interior are located directly in front of the vehicle occupants and are therefore always exposed to the risk of a head impact. Therefore, a new product has to pass a certified head impact test in order to be permitted for use.

For a display device, there is an increased risk of not passing such a test if the cover glass of the display device is splintered during the test. To prevent this, the cover glass or the display panel of the display device is advantageously supported flatly and early. For this purpose, it is necessary to make the distances between the components within the display device as small as possible. Due to the gap minimization within the display device, increased demands with respect to the precision are placed on the manufacturing of the individual parts and on the assembly.

In this context, US 2006/0203480 A1 describes a backlight having a plurality of lamps for light generation, a diffusing lens, a housing, and a first support element. The diffusing lens is arranged above the lamps and scatters the light. The housing has a bottom section and a side wall section, which extends from the bottom section in order to create a receptacle space for the lamps. The first support element is arranged on the bottom section in order to support the diffusing lens and has two sections inclined in relation to one another, which enable the impact forces transmitted from the diffusing lens to the bottom section to be reduced.

Matrix backlights utilize a plurality of light sources arranged in a matrix for light generation. However, this requires a greater distance between the light sources and the display panel of the display device to homogenize the light. This greater distance makes it more difficult to support the display panel flatly and early and thus to pass the head impact test.

Against this background, CN 103742840 A describes a backlight having a hollow body, in which light-emitting diodes are arranged, and an optical plate which is arranged on the hollow body. The side walls of the hollow body are made reflective. Support columns for supporting the optical plate are arranged in the hollow body.

It is an object of the disclosure to provide an improved display device having a matrix backlight.

SUMMARY

According to a first aspect of the disclosure, a display device has a display panel and a backlight for the display panel, wherein the backlight has a reflector having a plurality of reflectively embodied cavities, a plurality of light sources arranged in each case in the cavities, and support elements, which are transparent to light emitted from the light sources and protrude at least partially into a gap between the cavities and an optical component arranged below the display panel.

In the solution according to the disclosure, a reflector is arranged between the light sources and the display panel and fills the design-related gap between the light sources and the display panel or a further optical component arranged below the display panel. This reflector has a plurality of reflectively embodied cavities, in each of which a light source is arranged. The cavities orient the light emerging from the light sources toward the display panel. Additional supporting elements prevent the display panel or the cover glass from breaking. The use of supporting elements allows the use of different materials for the supporting elements and the reflector. Since the support elements protrude in relation to the cavities, the walls of the cavities do not extend up to the display panel or the further optical component. This could otherwise result in non-illuminated areas and thus in a visible grid structure. The support elements are made transparent and therefore do not influence the homogeneity of the illumination.

According to one aspect of the disclosure, the support elements are placed on walls of the cavities or incorporated into walls of the cavities. Due to this embodiment of the reflector, it can absorb energy. For example, the support elements may be adhesively bonded on the reflector or may be manufactured by means of two-component injection molding. The support elements may be incorporated into the walls, for example, by means of press-in technology or staking. It is not necessary to provide the entire surface of the backlight with support elements. Local positioning is also possible, for example restricted to edge areas or the middle area of the display panel. The energy absorption of the reflector may be set by a variation of the wall thicknesses or wall heights and thus may be adapted to the display device. Alternatively, the support elements may also be part of the optical component.

According to one aspect of the disclosure, the support elements are supported on a circuit board, on which the light sources are arranged. In this way, the support elements may additionally be used to stiffen the reflector. The support elements may be adhesively bonded, for example, as columns, with the circuit board.

According to one aspect of the disclosure, walls of the cavities are rounded and the cavities are designed to reflect the light emitted by the light sources toward the display panel. Due to the rounding, the emitted light may be reflected toward the display panel in a more targeted manner. At the same time, the rounding ensures increased buckling resistance or a lesser notch effect in the impact direction in the event of a head impact.

According to one aspect of the disclosure, the light sources are side-emitting light-emitting diodes. The use of side-emitting light-emitting diodes has the advantage that the formation of light spots in the backlight is prevented. This ensures illumination of the display panel that appears particularly homogeneous.

According to one aspect of the disclosure, the side-emitting light-emitting diodes emit light on all sides. This ensures an additional increase in the homogeneity of the lighting of the display panel.

According to one aspect of the disclosure, a gap is located between the support elements and a component to be supported by the support elements. Such a gap has the advantage that a tolerance compensation of the individual parts and a compensation for temperature expansions is enabled, without generating additional tension in the vertical structure. Moreover, the gap can be used for light mixing of the individual cavities to ensure homogeneous illumination. The component to be supported may be, for example, the display panel or an optical plate arranged between the reflector and the display panel.

According to one aspect of the disclosure, the cavities form a rectangular grid or a hexagonal grid. The reflector can be designed in various ways. Both the arrangement of the cavities in a rectangular grid and also the arrangement of the cavities in a hexagonal grid allow the reflector to be formed from a continuous matrix of cavities.

According to one aspect of the disclosure, the support elements are formed from polycarbonate or polymethyl methacrylate. These materials have the advantage that they have the desired transparency and are also inexpensive and easy to process.

A display device according to the disclosure is preferably used in a means of transportation. The means of transportation can be, for example, a motor vehicle but alternatively also an aircraft, a rail vehicle, or a watercraft.

Further features of the present disclosure will be evident from the following description and the appended claims in conjunction with the figures.

DETAILED DESCRIPTION

For a better understanding of the principles of the present disclosure, embodiments of the disclosure will be explained in more detail below with the aid of the figures. The same reference signs are used in the figures for identical or functionally identical elements and are not necessarily described again for each figure. It is understood that the disclosure is not limited to the illustrated embodiments and that the described features may also be combined or modified without departing from the scope of protection of the disclosure as defined in the appended claims.

Figure 1:
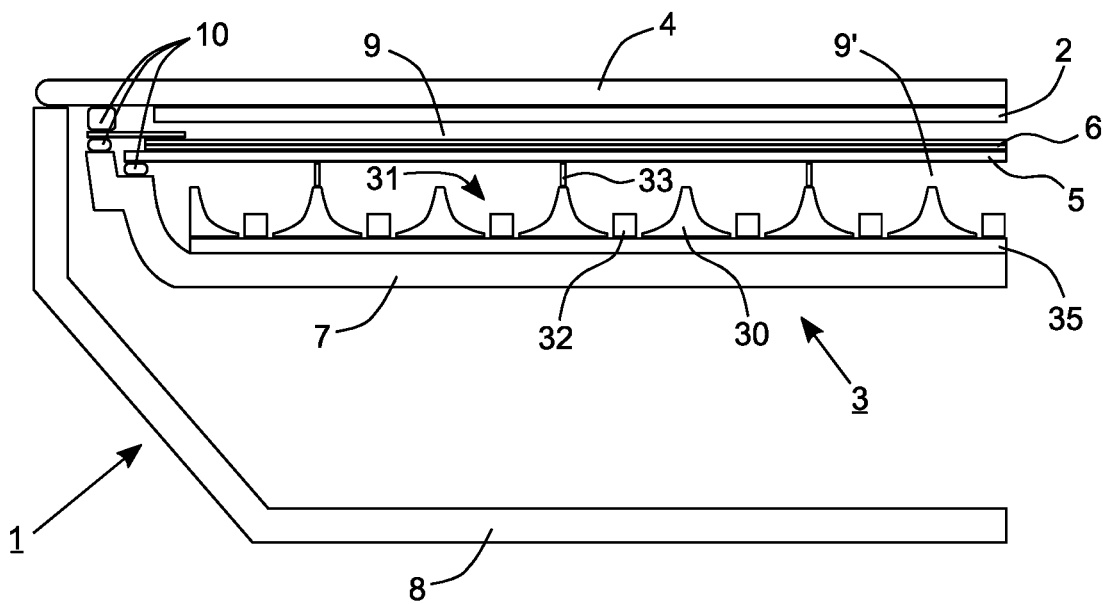
FIG. 1 schematically shows a detail of a display device according to the disclosure.

FIG. 1 schematically shows a detail of a display device 1 according to the disclosure. The display device 1 has a display panel 2, which is adhesively bonded to a cover glass 4. The cover glass 4 closes off a housing 8 of the display device 1 with respect to the environment. In a further housing 7, a backlight 3 for the display panel 2 is arranged. The backlight 3 has a reflector 30 with a plurality of cavities 31. One light source 32, typically a light-emitting diode, is arranged in each of the cavities 31. The light sources 32 are arranged on a circuit board 35, which can be adhesively bonded to the housing 7 of the backlight 3. Additional support elements 33 prevent the display panel 2 or the cover glass 4 from breaking in the case of a head impact. The support elements 33 are transparent to the light emitted by the light sources 32 and protrude in relation to the cavities 31. In the illustrated example, an optical plate 5 with a film stack 6 that is arranged thereon is located between the backlight 3 and the display panel 2. The films of the optical film stack 6 are intended to scatter, collect, or direct the light from the reflector 30 in a way such that the requirements regarding the solid angles of the backlight 3 are met. Typical films for directing light are brightness enhancement films (BEF) and light control films (LCF). The optical plate 5 is a transparent plate that ensures the optical distance between the optical film stack 6 and the light sources 32. The cover glass 4, the optical plate 5, and the housing 7 of the backlight 3 are connected to one another by suitable connecting elements 10, for example adhesive bonds. A gap 9 is located between the film stack 6 and the display panel 2. A further gap 9' is located between optical plate 5 and the cavities 31. The gap 9 between the display panel 2 and the optical plate 5 with the film stack 6 arranged thereon is sufficiently narrow that the cover glass 4 does not yet break when it is sufficiently deformed that it has reduced this gap 9 to zero. Upon further deformation, the cover glass 4 comes into contact with the support elements 33 via the optical plate 5 and the film stack 6 and is supported by them so that it does not deflect further, but rather is supported by the underlying parts.

Figure 2:
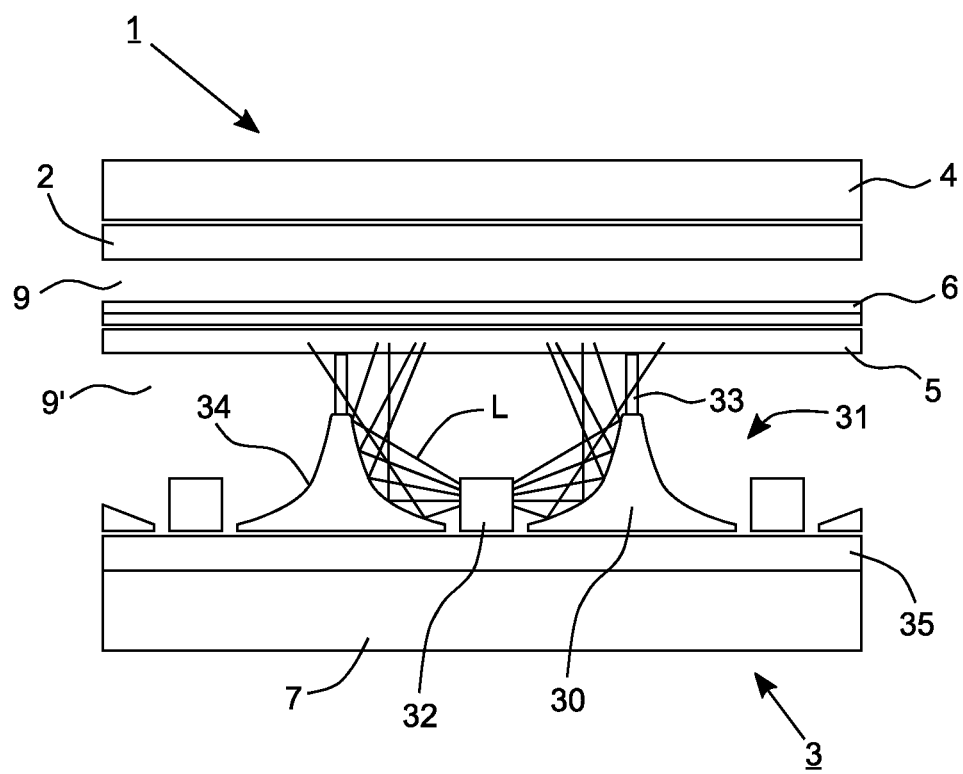
FIG. 2 schematically shows a detailed view of a display device according to the disclosure.

FIG. 2 schematically shows a detailed view of a display device 1 according to the disclosure. It shows the cover glass 4 with the display panel 2, the optical plate 5 with the film stack 6, and the backlight 3 with the housing 7, the circuit board 35 with the light sources 32 arranged thereon, and the reflector 30. The light sources 32 in this case are side-emitting light-emitting diodes, which preferably emit light L on all sides. The reflectively embodied walls 34 of the cavities 31 of the reflector 30 have a rounded design and orient the light L emerging from the light sources 32 in the direction toward the display panel 2. At the same time, the rounding ensures increased buckling resistance or a lesser notch effect in the impact direction in the event of a head impact. The transparent supporting elements 33 allow the light L to pass through unimpeded, except for a refraction that is not shown in FIG. 2. Suitable materials for the supporting elements 33 are polycarbonate or polymethyl methacrylate, for example. In one exemplary embodiment, the entire construction height of the display device preferably lies in the range of ~13.3 mm. The height of the reflector 30 can be ~3.72 mm, the width of the walls 34 at their widest point can be ~6.13 mm. The distance 9 between the film stack 6 and the display panel 2 is ~1.31 mm; the distance 9' between the reflector 30 and the optical plate 5 is ~1.05 mm. The distance between the light sources 32 can be ~9.13 mm, for example. The energy absorption of the reflector 30 can be set and thus adapted to the display device 1 by a variation of the wall thicknesses or wall heights.

Figure 3:
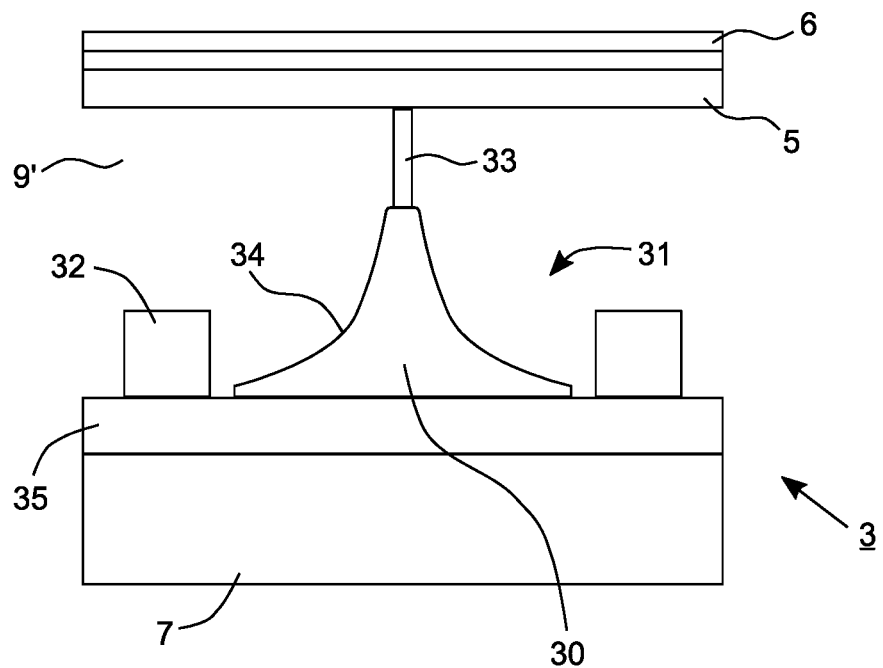
FIG. 3 schematically shows a first embodiment of a support element.

FIG. 3 schematically shows a first embodiment of a support element 33. It shows the optical plate 5 with the film stack 6 and the backlight 3 with the housing 7, the circuit board 35 with the light sources 32 arranged thereon, and the reflector 30. In this embodiment, the transparent support element 33 is placed on a wall 34 of the cavities 31 and extends up to the optical plate 5. However, a gap may instead also be located between the support element 33 and the optical plate 5. The support element 33 may be manufactured by means of two-component injection molding or adhesively bonded on the reflector, for example.

Figure 4:
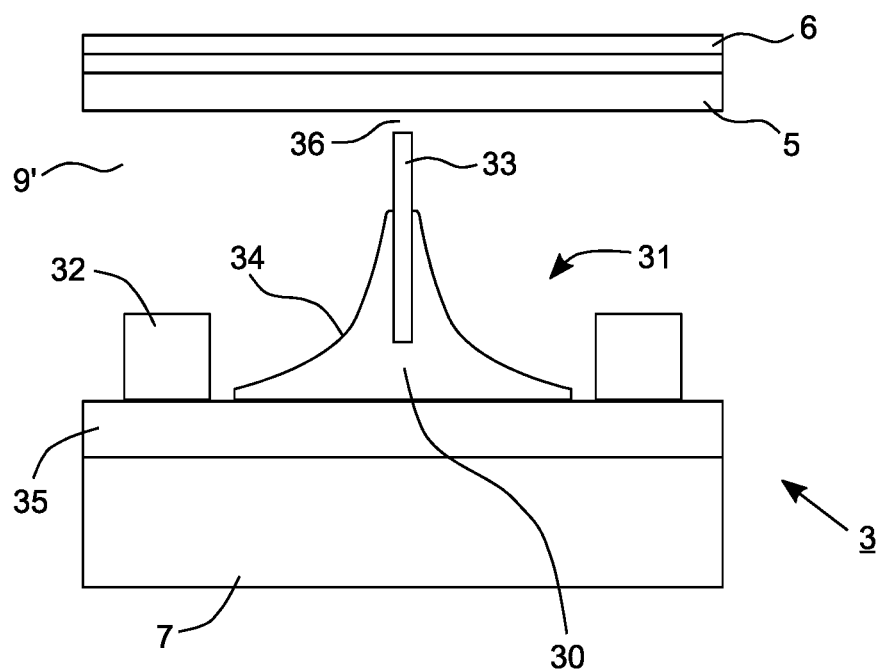
FIG. 4 schematically shows a second embodiment of a support element.

FIG. 4 schematically shows a second embodiment of a support element 33. It shows the optical plate 5 with the film stack 6 and the backlight 3 with the housing 7, the circuit board 35 with the light sources 32 arranged thereon, and the reflector 30. In this embodiment, the transparent support element 33 is incorporated in a wall 34 of the cavities 31. A gap 36 is located between the support element 33 and the optical plate 5. Alternatively, the support element 33 may extend up to the optical plate 5. The support element 33 may be incorporated in the wall 34, for example, by means of press-in technology or staking.

Figure 5:
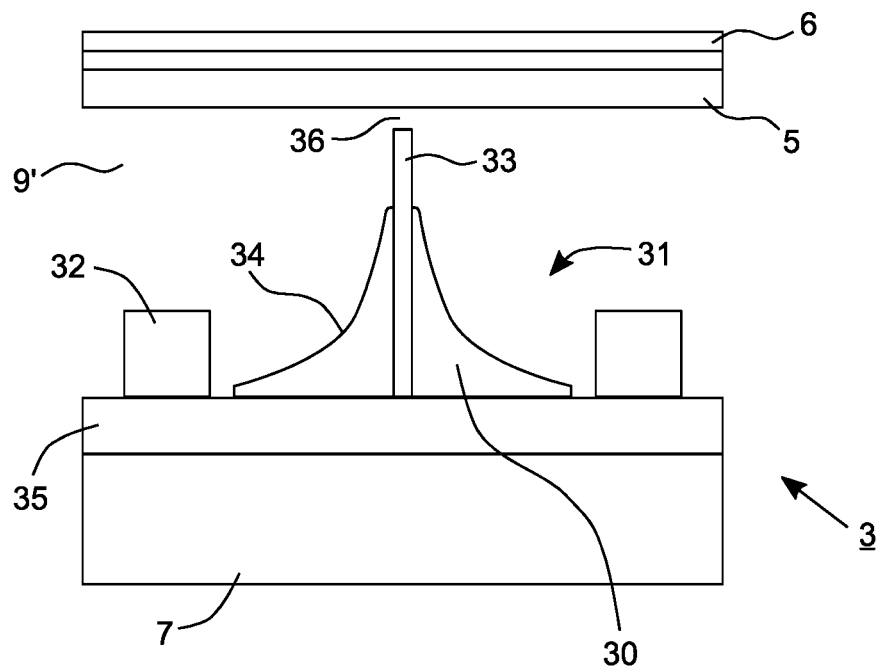
FIG. 5 schematically shows a third embodiment of a support element.

FIG. 5 schematically shows a third embodiment of a support element 33. It shows the optical plate 5 with the film stack 6 and the backlight 3 with the housing 7, the circuit board 35 with the light sources 32 arranged thereon, and the reflector 30. In this embodiment, the transparent support element 33 is incorporated in a wall 34 of the cavities 31, but is supported on the circuit board 35. In this way, the support elements 33 may additionally be used to stiffen the reflector 30. A gap 36 is located between the support element 33 and the optical plate 5. Alternatively, the support element 33 may extend up to the optical plate 5. The support element 33 may be adhesively bonded to the circuit board 35 as a column, for example.

Figure 6:
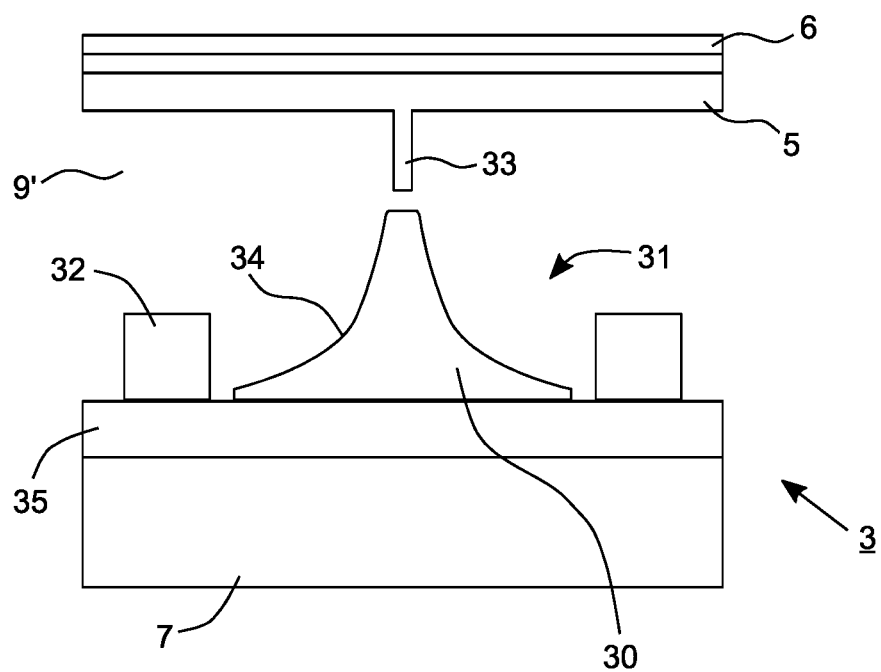
FIG. 6 schematically shows a fourth embodiment of a support element.

FIG. 6 schematically shows a fourth embodiment of a support element 33. It shows the optical plate 5 with the film stack 6 and the backlight 3 with the housing 7, the circuit board 35 with the light sources 32 arranged thereon, and the reflector 30. However, the transparent support element 33 is an integral part of the optical plate 5 in this embodiment.

Figure 7:
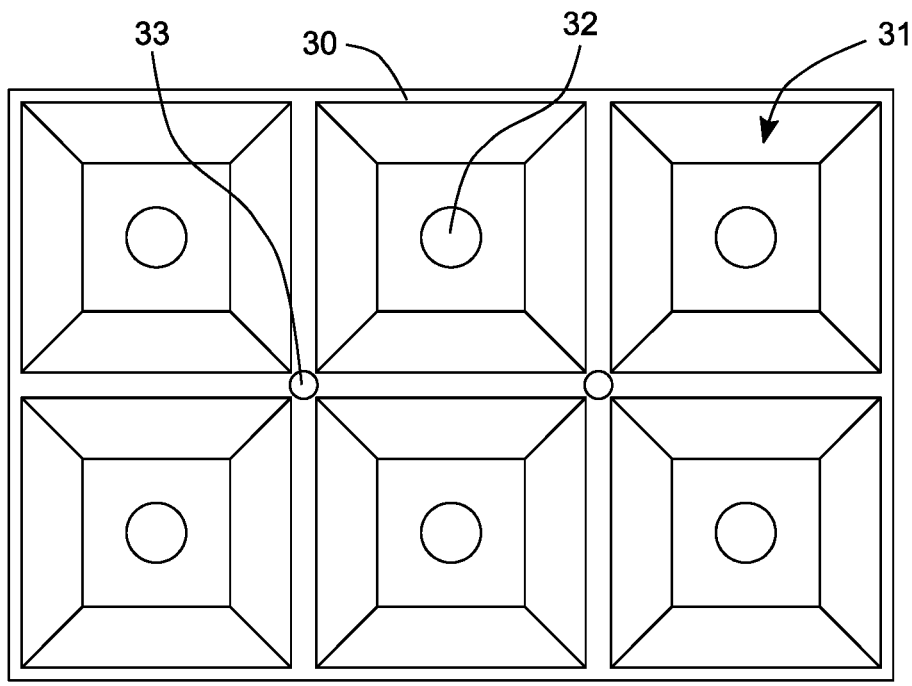
FIG. 7 schematically shows a reflector in which a rectangular grid is formed.

FIG. 7 schematically shows a reflector 30, in which a rectangular grid is formed. The arrangement of the cavities 31 and light sources 32 in a rectangular grid permits the reflector 30 to be formed from a continuous matrix of cavities 31. The entire area of the backlight is not necessarily provided with support elements 33 here. Local positioning is also possible, for example restricted to edge areas or a middle area in relation to the display panel.

Figure 8:
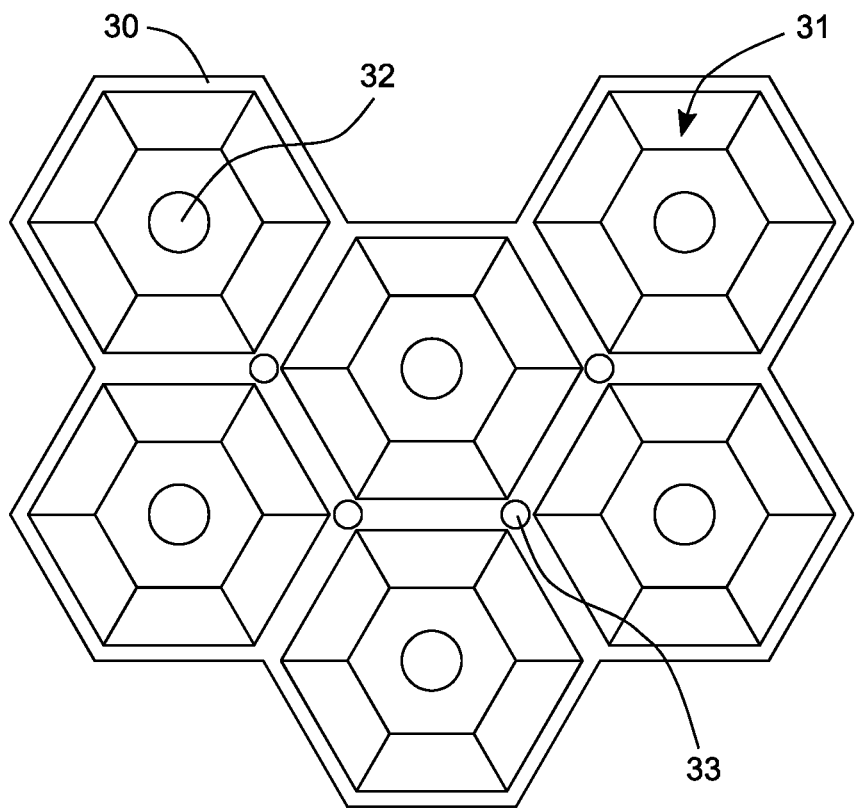
FIG. 8 schematically shows a reflector in which a hexagonal grid is formed.

FIG. 8 schematically shows a reflector 30, in which a hexagonal grid is formed. The arrangement of the cavities 31 and light sources 32 in a hexagonal grid also permits the reflector 30 to be formed from a continuous matrix of cavities 31. The entire area of the backlight is also not necessarily provided with support elements 33 in this case. Local positioning is also possible, for example restricted to edge areas or a middle area in relation to the display panel.

Figure 9:
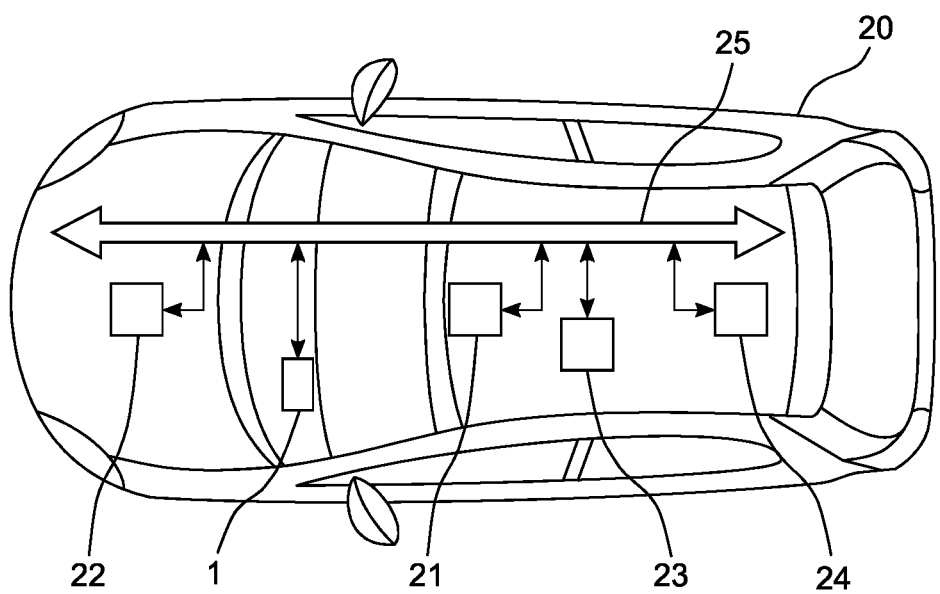
FIG. 9 schematically shows a means of transportation that utilizes a display device according to the disclosure.

FIG. 9 schematically shows a means of transportation 20 that utilizes a display device 1 according to the disclosure. The means of transportation 20 is a motor vehicle in this example. The motor vehicle has a display device 1 according to the disclosure, which is arranged in a dashboard. Data on the vehicle surroundings may be acquired by a sensor system 21. The sensor system 21 may in particular comprise surroundings recognition sensors, for example ultrasonic sensors, laser scanners, radar sensors, lidar sensors, or cameras. The information acquired by the sensor system 21 may be used to generate content to be displayed for the display device 1. Further parts of the motor vehicle in this example are a navigation system 22, by which positional information may be provided, and also a data transmission unit 23. A connection to a back-end, for example for receiving updated software for components of the motor vehicle, may, for example, be established by means of the data transmission unit 23. A memory 24 is present for storing data. Data is exchanged between the various components of the motor vehicle via a network 25.

The invention claimed is:

1. A display device comprising a display panel and a backlight for the display panel, wherein the backlight comprises:
    a reflector with a plurality of reflectively embodied cavities wherein the height of the reflector is about 3.72 mm;
    a plurality of light sources arranged in each of the cavities;
    support elements, which are transparent to light emitted by the light sources; and
    a gap between the cavities and an optical component arranged below the display panel, wherein the support elements protrude at least partially into the gap between the cavities and the optical component arranged below the display panel, wherein the support elements are placed on walls of the cavities or are incorporated in walls of the cavities but do not contact the optical component, and prevent the display panel from breaking in a case of a head impact.

2. The display device as claimed in claim 1, wherein the support elements are supported on a circuit board, on which the light sources are arranged.

3. The display device as claimed in claim 1, wherein walls of the cavities are rounded and the cavities are designed to reflect the light emitted by the light sources in the direction of the display panel.

4. The display device as claimed in claim 3, wherein the light sources are side-emitting light-emitting diodes.

5. The display device as claimed in claim 4, wherein the side-emitting light emitting diodes emit light on vertical sides.

6. The display device as claimed in claim 1, wherein the cavities form a rectangular grid or a hexagonal grid.

7. The display device as claimed in claim 1, wherein the support elements are formed from polycarbonate or polymethyl methacrylate.

8. A motor vehicle, comprising:
    a display device comprising a display panel and a backlight for the display panel, wherein
    the backlight comprises:
        a reflector with a plurality of reflectively embodied cavities wherein the height of the reflector is about 3.72 mm;
        a plurality of light sources arranged in each of the cavities;
        support elements, which are transparent to light emitted by the light sources; and
        a gap between the cavities and an optical component arranged below the display panel, wherein the support elements protrude at least partially into the gap between the cavities and the optical component arranged below the display panel, wherein the support elements are placed on walls of the cavities or are incorporated in walls of the cavities but do not contact the optical component, and prevent the display panel from breaking in a case of a head impact.

* * * * *